United States Patent [19]

Akahori

[11] 4,076,047

[45] Feb. 28, 1978

[54] REED VALVE

[75] Inventor: Masami Akahori, Shizuoka, Japan

[73] Assignee: Nippon Oil Seal Industry Co., Ltd., Japan

[21] Appl. No.: 692,914

[22] Filed: Jun. 4, 1976

[30] Foreign Application Priority Data

Jul. 16, 1975    Japan .............................. 50-97821[U]

[51] Int. Cl.² ............................................ F16K 15/14
[52] U.S. Cl. .................................... 137/856; 251/359
[58] Field of Search ............... 137/855, 856, 857, 858, 137/512.15; 251/359

[56]           References Cited
          U.S. PATENT DOCUMENTS

| 338,609 | 3/1886 | Nysewander | 137/858 |
| 1,555,192 | 9/1925 | Dennedy | 137/512.15 X |
| 2,217,380 | 10/1940 | Pedder et al. | 137/855 X |
| 3,949,716 | 4/1976 | Liu | 137/856 X |

Primary Examiner—William R. Cline
Attorney, Agent, or Firm—Holman & Stern

[57]           ABSTRACT

An improvement in valves for suction or exhaust passages of an internal combustion engine, wherein the projection of the plane of the fixing seat of the valve plate and the plane of the valve seat are not parallel. The fixing seat can be tapered. The valve seat can either have a straight angle taper or a curved face. The angle of difference between the two planes is from 30' to 10°, preferably from 1° to 3°.

14 Claims, 4 Drawing Figures

REED VALVE

INTRODUCTION

This invention relates to a reed valve used for the suction or exhaust passage of an internal combustion engine, and more particularly to a reed valve in which the close contact of the reed valve plate and the valve seat is improved.

BRIEF DESCRIPTION OF THE DRAWINGS

The disadvantages of the prior art reed valves and the advantages of the reed valves of the present invention will be more clearly understood when reference is made to the drawings wherein.

DETAILED DESCRIPTION OF PRIOR ART AND PREFERRED EMBODIMENTS

Figure 1:
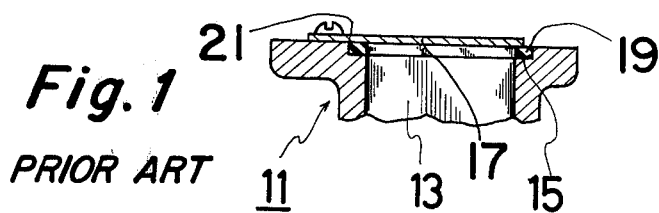
FIG. 1 is a longitudinal sectional view of the conventional prior art reed valve.

In the reed valve of the prior art type having a rubber elastic valve seat provided to the body of the valve, an annular cut-out stepped portion 15 has heretofore been provided at the inlet of the valve port 13 of the valve body 11. The rubber elastic valve seat 19 is seized to the stepped portion 15, as shown in FIG. 1. Normally in order to provide the necessary flatness of the surface of the rubber elastic valve seat 19, the rubber elastic valve seat 19 and the body 11 are simultaneously polished thereby obtaining a good valve seat 19 having preferred surface flatness.

However, as a result of the fact that the two materials has different hardnesses, the body 11 made of metal, and the valve seat 19, made of rubber elastic material, the simultaneous polishing results in, trimmed portions of the valve seat projecting in the neighborhood of the boundary 21 of the body 11 and the valve seat 10. Accordingly, when the reed valve plate 17 is mounted, a problem results in that a gap occurs between the reed valve plate 17 and the valve seat 19 because the projections near the boundary 21 push the reed valve plate 17 up. Further, in the conventional art wherein the reed valve plate 17 is disposed in parallel with the valve seat 19, even if the aforementioned trimmed portions are not removed, it is difficult to eliminate a gap between the valve seat 17 and the reed valve 19.

The present invention eliminates the aforementioned disadvantages of the conventional reed valve, and will now be described in detail based on the embodiments illustrated in FIGS. 2, 3 and 4.

Figure 2:
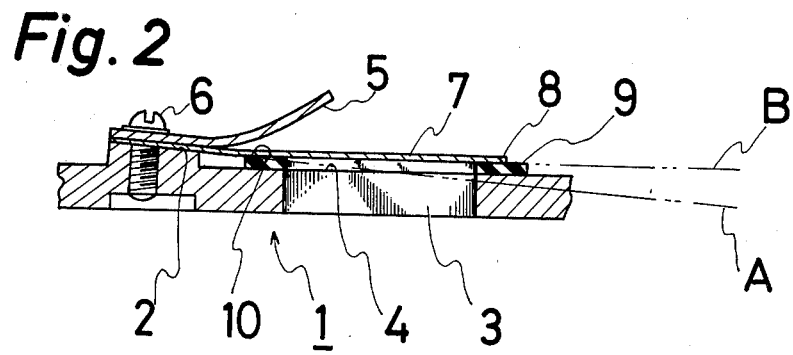
FIGS. 2, 3 and 4 are longitudinal sectional views of various embodiments of the reed valve of the present invention.

In FIG. 2, a valve port 3 is provided in the body 1 made of metal material such as iron or aluminum. On the body surface 4 disposed in the neighborhood of the valve port 3 of the valve body 1, a tapered fixing seat 2 is provided for the valve plate 7 converging with respect to the upper surface 4 of the body 1 toward the valve port 3 of the body 1 at the projected position from the upper surface 4 of the body 1.

Further, on the upper surface 4 of the body 1, a valve seat 9 is fixed made of rubber elastic material preferably being gasoline-resistant such as nitryl and fluorine containing rubber, having uniform thickness, by means of an adhesive or seizure so as to surround the valve port 3 of the body 1.

On the other hand, a flat reed valve plate 7 made of metal material and a stopper 5 warped upward in FIG. 2 by a certain predetermined curvature, are integrally fixed to the fixing seat 2 of the body 1 by means of a screw 6. As a result, the reed valve plate 7 is originally extended toward A in FIG. 2 along the tapered plane of the fixing seat 2, but the valve plate 7 is prevented from being extended toward A by the valve seat 9 and is bent toward B at the cross point 10 in FIG. 2.

Figure 3:
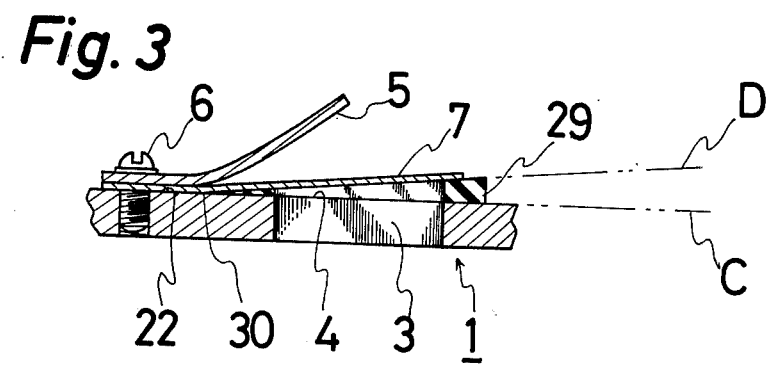

FIG. 3 illustrates another embodiment of the reed valve of the present invention. A valve port 3 is provided in the body 1 similarly made of metal material to that shown in FIG. 2, and on the upper surface 4 of the body 1 disposed in the neighborhood of the valve port 3 of the valve body 1, a fixing seat 22 is provided of the same plane as that of the upper surface 4 of the body 1.

In addition, on the upper surface 4 of the body 1, a tapered valve seat 29 is fixed and converges with respect to the upper surface 4 of the body 1 toward the fixing seat 22. The valve seat 29 is made of a rubber elastic material and is fixed by adhesive seizure so as to surround the valve port 3 of the body 1.

A flat reed valve plate 7 made of metal material and a stopper 5 are integrally fixed on the fixing seat 22 by a screw 6. As a result, the reed valve plate 7 is originally extended toward C along the flat fixing seat 22, but the reed valve plate 7 is bent toward a line D at the cross point 30 by the valve seat 29.

In the embodiments shown in FIGS. 2 and 3, the angles between lines A and B or C and D is in the range from 30' to 10°, preferably from 1° to 3°.

Figure 4:
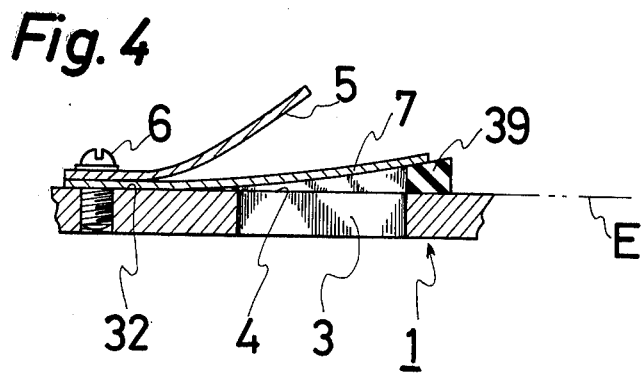

FIG. 4 further illustrates other embodiment of the reed valve of the present invention similar to the embodiment shown in FIG. 3. In FIG. 3, the upper surface of the valve seat 29 is a flat surface. But in this embodiment, the upper surface of the valve seat 39 is a curved surface which is diverged gradually from the projection E of the surface of the fixing seat 32 according to the increase of the distance from the fixing seat 32. And the reed valve plate 7 is originally extended along the line E, but it is bent along the curved surface of the valve seat 39.

Since the reed valve of the present invention has the aforementioned construction, the following operation and advantages are experienced.

By the construction that the fixing seat 2 is converged in tapered form with respect to the upper surface 4 of the body 1 toward the end 8 of the reed valve plate 7 or that the valve seat 29 or 39 is converged in tapered form with respect to the upper surface of the body 1 toward the fixing seat 22 or 32, the close contact of the reed valve plate 7 to the valve seat 9, 29 or 39 results, and even though the surface of the valve seat 9, 29 or 39 is not so accurately finished, the preferred sealing function can be expected, and even if the reed valve plate 7 is deformed more or less, good sealing function can be expected.

Incidentally, although not indicated in FIGS. 2, 3 and 4, the fixing seat 2, 22 or 32 may be formed in tapered shape, and the valve seat 9, 29 or 39 may also be formed in tapered shape.

What I claim is:

1. In a valve comprising a body having a valve port, a fixing seat on said body, a stopper, a reed valve plate covering said valve port said plate being flat in an unassembled state and in an assembled state interposed between said fixing seat of said body and said stopper, and a rubber elastic valve seat fixed onto the upper surface of said body surrounding said valve port bearing said reed valve plate, the improvement wherein the surface of said fixing seat of said body and the surface of said valve seat are not in the same plane, the surface of said valve seat is gradually diverged from the projection of the plane of the surface of said fixing seat and the thickness of said valve seat is gradually increased according to the increase of the distance from said fixing seat, said reed valve plate is biasingly bent in the neighborhood of the cross-point of said projection and the projection of the plane of the surface of said valve seat in an assembled state, and said reed valve plate extends along and is biased into contact with the surface of said valve seat.

2. The improvement as claimed in claim 1, wherein the angle between the projections of the plane of the fixing seat surface and the plane of the valve seat surface is in the range of 30' to 10°.

3. The improvement as claimed in claim 2, wherein the angle is in the range of 1° to 3°.

4. The reed valve as claimed in claim 1, wherein said rubber elastic valve seat is converged in taper form with respect to the upper surface of said body toward the fixing seat surface.

5. The improvement as claimed in claim 1, wherein the surface of the rubber elastic valve seat is a flat surface.

6. The reed valve as claimed in claim 5, wherein the reed valve plate is bent on the cross point of the projection of the plane of the fixing seat surface and the projection of the plane of the valve seat surface.

7. The improvement as claimed in claim 5, wherein the angle between the projections of the plane of the fixing seat surface and the valve seat surface is in the range of 30' to 10°.

8. The improvement as claimed in claim 7, wherein the angle is in the range of 1° to 3°.

9. The improvement as claimed in claim 1, wherein the surface of the rubber elastic valve seat is a curved surface.

10. The improvement as claimed in claim 1, wherein the rubber elastic valve seat is made of rubber elastic material which is gasoline-resistant.

11. The improvement as claimed in claim 10, wherein the rubber elastic material is nitryl containing rubber.

12. The improvement as claimed in claim 10, wherein the rubber elastic material is fluorine containing rubber.

13. The improvement as claimed in claim 1, wherein said body is made of iron.

14. The improvement as claimed in claim 1, wherein said body is made of aluminum.

* * * * *